United States Patent [19]

Feher et al.

[11] Patent Number: 4,720,839
[45] Date of Patent: Jan. 19, 1988

[54] EFFICIENCY DATA TRANSMISSION TECHNIQUE

[75] Inventors: Kamilo Feher, El Macero, Calif.; Kuang-Tsan Wu, Burnaby, Canada; John C. Y. Huang, Palo Alto; Donald E. MacNally, Campbell, both of Calif.

[73] Assignee: University of Ottawa, Ottawa, Canada

[21] Appl. No.: 937,086

[22] Filed: Dec. 2, 1986

[51] Int. Cl.$^4$ ............... H04L 25/34; H04B 15/00
[52] U.S. Cl. .................................. 375/18; 375/58; 375/60
[58] Field of Search .............. 375/18, 60, 34, 58, 375/17, 101, 103; 360/45

[56] References Cited

U.S. PATENT DOCUMENTS

| | | | |
|---|---|---|---|
| 3,380,330 | 6/1968 | Kretzmer | 375/122 |
| 3,457,510 | 7/1969 | Lender | 375/60 |
| 3,515,991 | 6/1970 | Lender | 375/18 |
| 3,573,622 | 4/1971 | Holzman et al. | 375/18 |
| 3,947,767 | 3/1976 | Koike et al. | 375/18 |
| 4,123,710 | 10/1978 | Stuart et al. | 375/18 |
| 4,439,863 | 3/1984 | Bellamy | 375/18 |

Primary Examiner—Robert L. Griffin
Assistant Examiner—Andrew J. Telesz, Jr.
Attorney, Agent, or Firm—Pascal & Associates

[57] ABSTRACT

Partial response and quadrature partial response data transmission system characterized by increased transmission rate, lower signal-to-noise ratio, low cost and simpler hardware implementation than prior art systems. A steep filter (almost rectangular) is connected to the output of a cosine filter, forming a composite filter, wherein the cut-off frequency of the rectangular filter is less than the Nyquist frequency by a predetermined amount which is inversely proportional to the amount in percentage by which the data transmission rate exceeds the Nyquist rate. The system is thus capable of signalling at the Nyquist rate and greater, without requiring that channel filter parameters or the basic clock rate be adjusted. A smaller number of signal levels can be selected (as compared to previously existing methods) for spectrally efficient applications, and the resulting more robust system can also be used to transmit PAM, QAM, and other baseband or modulated signals.

28 Claims, 9 Drawing Figures

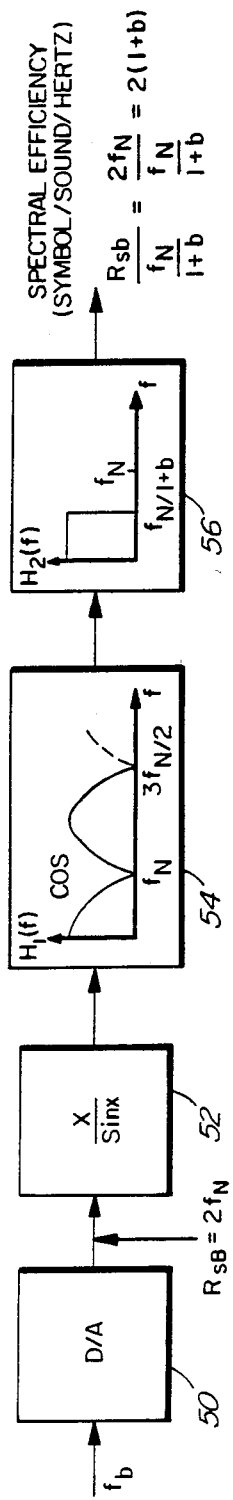
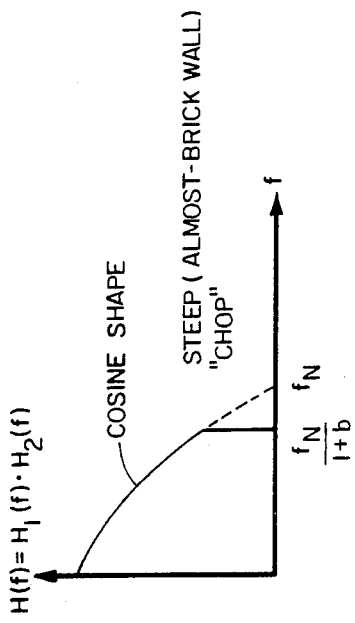
FIG. 3A
FIG. 3B

EFFICIENCY DATA TRANSMISSION TECHNIQUE

BACKGROUND OF THE INVENTION

This invention relates in general to digital communication systems, and in particular to an improved partial response digital data transmission system.

Digital communication systems, such as microwave systems, have been developed to provide high quality, reliable communications for digitized voice, data and video signals. Such systems are particularly useful for interlinking computers and other digital sources over long and short-haul transmission media.

Partial response (PR) and quadrature partial response (QPR) transmission techniques have been used extensively in microwave, cable and twisted-wire digital transmission systems. An advantage of the PR and QPR transmission techniques (also known as correlative and/or duobinary transmission techniques), lies in their relatively simple filtering strategy and implementation. Also, to a limited extent, it is possible using prior art PR and QPR techniques, to transmit data at rates which exceed the well known Nyquist transmission rate $R_N=2f_N$, where $f_N$=Nyquist frequency.

A detailed description of partial response, or correlative coding techniques, is presented by Dr. A. Lender in Chapter 7 of a reference book by Dr. K. Feher entitled Digital Communications: Microwave Applications, Prentice Hall Inc., 1981, as well as in several patents which have issued on the subject.

U.S. Pat. No. 3,573,622, entitled Partial Response Signalling Sampling for Half Speed Data Transmission, discloses a technique for modifying signalling characteristics of a normal multi-level partial response line signal to provide a two level line signal for facilitating initialization procedures, such as timing recovery and automatic equalizer control. It also provides means for signalling at one-half the Nyquist rate without changing channel filters or the basic clock rate.

U.S. Pat. No. 3,947,767, entitled Multi-level Data Transmission System, discloses a unique differential coding scheme utilized in a partial response system for resolving phase ambiguity difficulties which are introduced by carrier recovery circuitry.

U.S. Pat. No. 4,123,710, entitled Partial Response QAM Modem, discloses a data communication system which combines QAM and partial response techniques. In particular, an optimum combination of multi-level encoding and QAM and partial response techniques are employed to provide digital transmission through a telephone voice channel at a specific data rate, less than or equal to the Nyquist rate.

U.S. Pat. No. 4,439,863, entitled Partial Response System with Simplified Detection, discloses a simple means for demodulating and detecting eight PSK/PRS signals which have a complex output signal set which can not normally be detected in a straight-forward manner. The disclosed technique utilizes two dimensional decision feedback to translate incoming quadrature signals to a new origin and then enables the use of a conventional 8-PSK decoder/detector which detects only the reduced signal set, not the complete output signal set.

None of the prior art U.S. patents relate to transmission above the Nyquist rate. Conventionally, transmission above the Nyquist rate in PR and QPR systems is achieved by simply increasing the signalling rate with the transmission characteristics being kept fixed. It has been found through experimentation, as discussed below, that reasonably good performance can be achieved with above Nyquist rate signalling in the case of 3-level partial signals, however performance deteriorates as the number of signalling levels is increased above three.

Prior art PR and QPR system block diagrams are shown in FIGS. 1A and 1B respectively. For example, with reference to FIG. 1A, a data signal is transmitted at a binary rate of $f_b$=800 kb/s and is applied to a digital-to-analog converter 1, which in response generates an 8-level output signal at a rate of $R_{sa}$=800 kb/s/3=266 ksymbol/s. The output signal is applied to a duobinary encoder 3 which generates a 15-level signal which is band limited to the Nyquist frequency $f_N=R_{sa}/2$=133 kHz. Thus, the input binary signal is converted to a 15-level partial response signal having a spectral efficiency of 800 kb/s≈133 kHz=6 b/s/Hz or 266 ksymbol/s≈133 kHz=2 symbol/s/Hz at the Nyquist rate. The 15-level partial response signal is then quadrature modulated and transmitted via radio, microwave, etc., through a transmit channel medium subject to extraneous channel noise, and designated by summer 5. The transmitted signal is demodulated by a conventional coherent QPRS demodulator and fed to the receive filter 7 and subsequently reconverted to a digital binary signal via an analog-to-digital converter 9.

With reference to the prior art QPR modem shown in FIG. 1B, a binary data signal is transmitted at a predetermined source rate and applied via serial-to-parallel converter 11 into "in-phase" and "quadrature" signal paths each comprised of a digital-to-analog converter (13 and 15), a duobinary encoder (17 and 19) and a signal multiplier (21 and 23). A local oscillator 25 generates a carrier signal for application to multiplier 21, and via 90° phase shifter 27 to multiplier 23. The orthogonal signals output from multipliers 21 and 23 are summed via signal summer 29 and applied via an optional bandpass filter 31 to the transmit channel 5, for reception by a conventional QPRS demodulator 33.

With reference to FIG. 2A, a prior art duobinary encoder is shown in detail. Data signals are received and transmitted at a rate of $R_{sa}=2f_N(1+a)$, where "a" represents the amount in percentage by which the transmission rate exceeds the Nyquist rate $R_N$. The data signals are typically filtered via an optional analog amplitude equalization filter 40 and applied to a cosine filter 42, typically implemented using well known digital circuitry. The signal output from filter 42 is applied to a rectangular transmission filter 44 having a cut-off frequency equal to the Nyquist frequency of $f_N$.

The combined transfer function H(f) due to filters 42 and 44 is illustrated in FIG. 2B, wherein $H(f)=H_1(f)\cdot H_2(f)$.

It has been found that the prior art system of FIG. 2A exhibits approximately 43% speed-tolerance when using 3-level duobinary encoding, and approximately 8% tolerance when using 5-level duobinary encoding. In other words, using a 5-level system based on the prior art duobinary encoder of FIG. 2A, data signals can be transmitted at only 8% above the Nyquist rate before intersymbol interference becomes too great for error free transmission.

A convenient and well known technique for evaluating intersymbol interference is by means of an eye diagram, or eye pattern. Eye diagrams are described for example on page 52 of the aforementioned reference book by K. Feher.

An eye diagram for the 3-level PR (corresponding to a 9-QPR) system transmitting at a Nyquist rate of $R_N=2$ bits/second/Hertz and utilizing the prior art duobinary encoder discussed with reference to FIG. 2A, is characterized by completely open "eyes" indicating no intersymbol interference, i.e a completely open "vertical" eye diagram.

Eye diagrams for the 3-level PR system transmitting at data rates greater than the Nyquist rate by $a=20\%$ and $a=40\%$ respectively, when using the encoder of FIG. 2A, were characterized by increasingly degraded eyes, i.e. reduced vertical eye openings. In particular, at $a=40\%$ above the Nyquist rate $R_N$, the spectral efficiency was found to be $2(1+a)=2.8$ bits/second/Hertz, and the eye diagram was almost completely closed, indicating a substantial amount of intersymbol interference.

The eye diagram for a prior art 7-level PR (or equivalent 49-QPR system) operating at the Nyquist transmission rate, was characterized by substantially open eyes and a spectral efficiency of 4 bit/second/Hertz while the same system operating at $a=20\%$ was characterized by a practically closed eye diagram such that, at the sampling instants it was not possible to clearly distinguish between the 7-levels.

The eye diagram for a prior art 15-level PR (or 225-QPR) system transmitting at 5% higher than the Nyquist rate, was characterized by a spectral efficiency of 6.30 bits/second/Hertz and almost completely closed eyes, while the eye diagram at 7.5% higher than the Nyquist rate was characterized by a completely closed eye.

Therefore, it is apparent that in the case of multi-level systems, the speed tolerance of prior art PR and QPR transmission systems is dramatically reduced in relation to binary or tertiary systems. For example, the 43% speed tolerance exhibited by the aforementioned 3-level duobinary system is reduced to less than 20% for a 7-level or higher system.

The shortcomings of prior art PR and QPR transmission systems can be appreciated with reference to a practical application. For highly spectral efficient applications, such as "data-in-voice" supergroup modem applications, data source transmission rates of up to $f_b=1.544$ Mb/s are required, which with the inclusion of overhead bits, results in a total rate of approximately $f_b=1.6$ Mb/s or higher, for transmission in a bandwidth of 256 kHz. With the inclusion of side band filters for establishing CCITT Standard FDM-Multiplex guard bands, the transmission bandwidth is reduced to approximately 240 kHz. Thus, a spectral efficiency of 6.66 b/s/Hz or more would be required for accurate transmission. The theoretical Nyquist rate of a $15\times15=225$ QPRS modem is 6 b/s/Hz. In order to transmit a 1.6 Mb/s data signal by means of a standard 225-QPRS modem, in a supergroup 240 kHz band, a transmission rate which is 11% higher than the Nyquist rate would be required. An eye diagram for such a system according to prior art techniques with $a=11\%$, is characterized by complete eye closure as discussed above, yielding an unusable system.

SUMMARY OF THE INVENTION

According to the present invention, a transmission system is provided wherein a very steep (approximately rectangular) filter is connected to the output of a cosine filter, forming a composite filter, and wherein the cut-off frequency of the rectangular filter is less than the Nyquist frequency by a predetermined amount which is inversely proportional to the amount in percentage by which the transmission rate exceeds the Nyquist rate.

Thus, according to the present invention, increased data transmission rates and better performance (i.e. speed tolerance) are obtained over prior art PR and QPR systems.

BRIEF DESCRIPTION OF THE DRAWINGS

FIG. 3A is a block diagram of the transmission system according to the present invention in its most general form, FIG. 3B is a graph illustrating the combined transfer function characterizing the transmission system of the present invention.

The partial response (PR) baseband system according to the present invention in its most general form, is illustrated in FIG. 3A. A digital-to-analog (D/A) converter 50 receives a digital input data signal having a bit rate designated as $f_b$. The digital signal is converted to analog form in converter 50 and applied to an x/sinx shaped aperture equalizer filter 52. A half-cosine filter 54, typically implemented using either digital or analog methods, is connected to the output of the equalizer filter 52. A steep (approximately rectangular) filter 56 is connected to the output of half-cosine filter 54, and is characterized by a steep filter amplitude roll-off skirt. The filter 56 requires a very steep roll-off, however, it does not require phase equalization near the band edge. For this reason it is not difficult to implement this steep filter with conventional technology. This is because the half-cosine filter 54 assures that the signal spectrum is sufficiently attenuated close to the Nyquist frequency $f_N$. The steep filter 56 attenuates or chops-off the signal power beyond $f_N/(1+b)$, where "b" is a number representing the percentage above the Nyquist rate at which transmission is occurring.

Figure 2A:
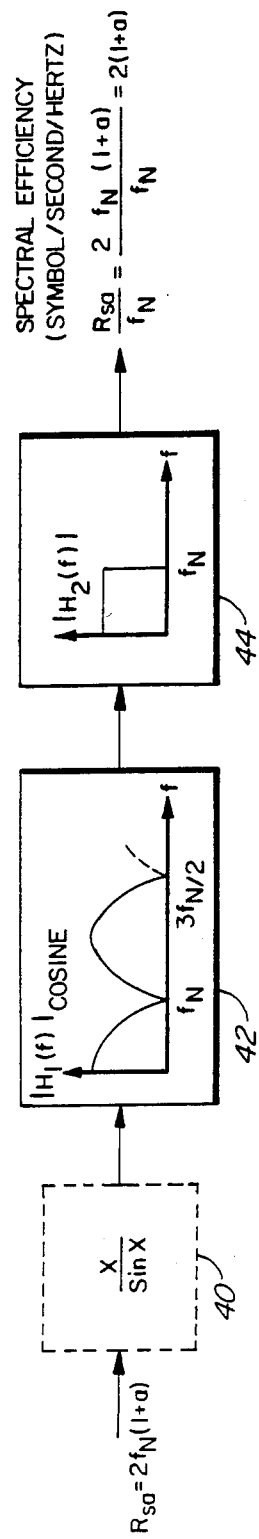
FIG. 2A is a block diagram of a prior art duobinary encoder.
Figure 2B:
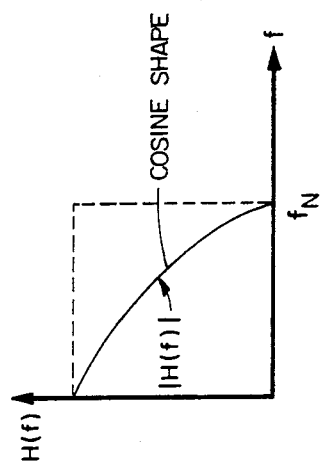
FIG. 2B is a block diagram illustrating the combined transfer function characterizing the transmission system of the prior art.

The combined transfer function H(f) due to filters 52 and 54, is characterized by the frequency response illustrated in the graph of FIG. 3B. For $b=0$, the frequency response is similar to the prior art encoder of FIG. 2A. However, at $b=0.05$, a very steep (almost brick wall) attenuation occurs at $f=0.95f_N$, resulting in error free transmission at 5% faster than the Nyquist rate $R_N$.

Consider the following example, wherein the data source bit rate is $f_b=800$ kb/s. The 800 kb/s data stream is converted via D/A 50 into an 8-level PAM baseband sequence by using three consecutive input bits to form an $R_{sb}=f_b/3=266.67$ k Baud (or k symbols/second)

data stream. The x/sinx aperture equalizer filter 52 is employed to convert the multi-level pulse signal into a multi-level impulse stream signal. The 8-level PAM signal output from equalizer filter 52 is then transformed into a 15-level PR signal via cosine filter 54 in a well known manner. Thus, the Nyquist frequency is $f_N = R_{sb} \approx 2 = 133.33$ kHz.

Steep skirt filters such as 56, which do not require phase equalization near the band edge, are readily available and have been constructed using both analog and digital circuitry. According to a successful prototype, filter 56 was a low pass filter characterized by a flat in-band response up to 110 kHz and a 40 dB attenuation at frequencies above 128 kHz. Such filters are manufactured for instance, by Karkar Electronics, Inc., San Francisco, and described in U.S. Pat. No. 3,271,705 of Karkar.

Figure 4:
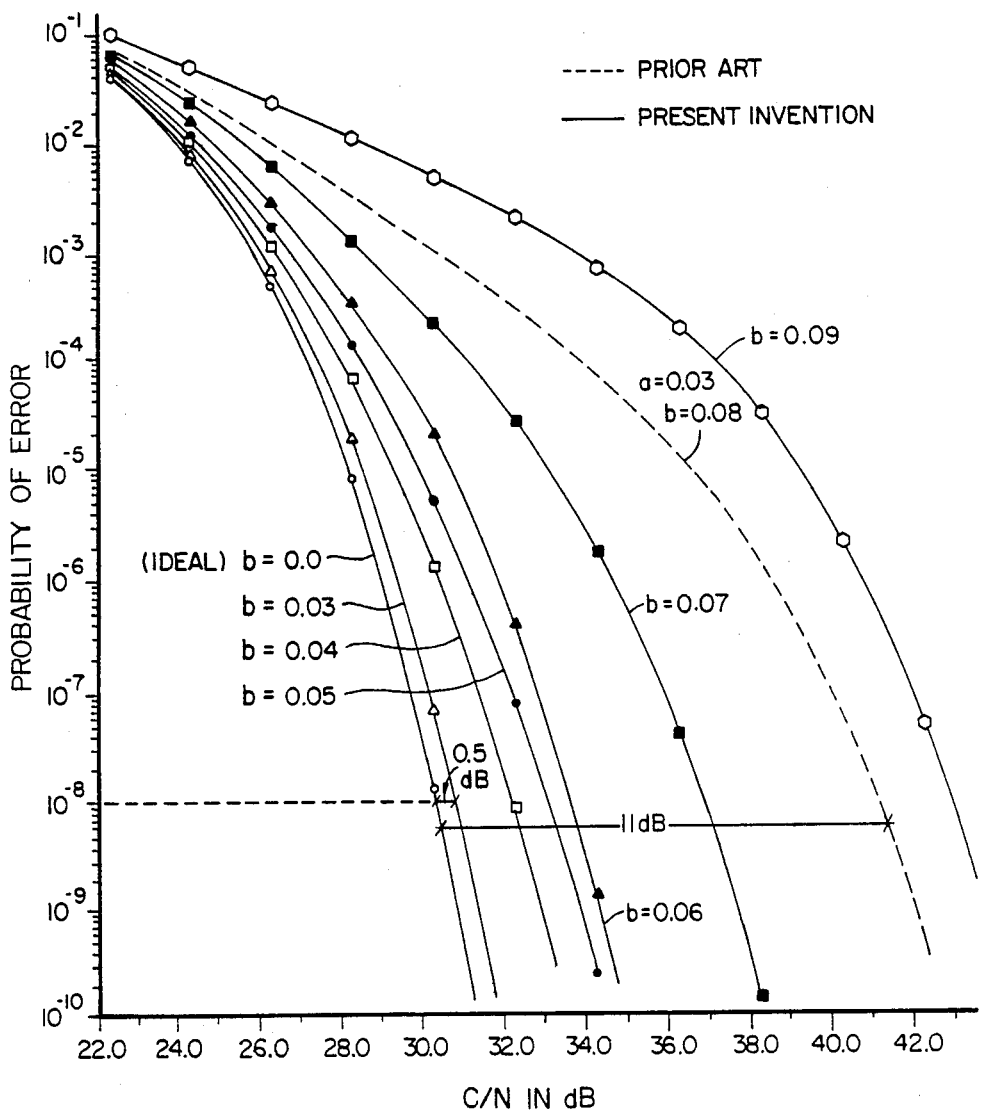
FIG. 4 is a graph showing the probabilities of error using the system of the present invention as compared to prior art systems.

With reference to FIG. 4, a graph of the probability error of a 225-QPRS modem is illustrated, for comparing the performance of the systems according to the present invention and the prior art. The probability of error is plotted in relation to the percentage above the Nyquist rate at which the data was transmitted. Results for the system according to the present invention are illustrated in continuous lines and the result for the prior art PR and QPR systems is shown in dashed lines. From FIG. 4, it can be seen that at 3% above the Nyquist rate, the C/N (carrier-to-noise ratio) degradation at $10^{-8}$ probability of error is only 0.5 decibels while according to the prior art technique, it is approximately 11 decibels.

According to a number of experiments conducted for analyzing the performance of the successful prototype, eye diagrams were generated which yielded open eyes for a Nyquist transmission rate at 768 kb/s utilizing a 15-level partial response encoder and a steep analog filter having 40 dB attenuation at the Nyquist frequency of 128 kHz. At 5% above the 6 bit/second/Hertz Nyquist rate, i.e., at a data rate of 800 kb/s, the eyes were still open. Even at a data rate of b=11% above the Nyquist rate, the eyes were open. Thus, in contrast to the prior art 225 QPRS modem discussed above, a 225 QPRS modem in accordance with the present invention was capable of error free transmission at a data rate of 11% higher than the Nyquist rate.

Figure 5:
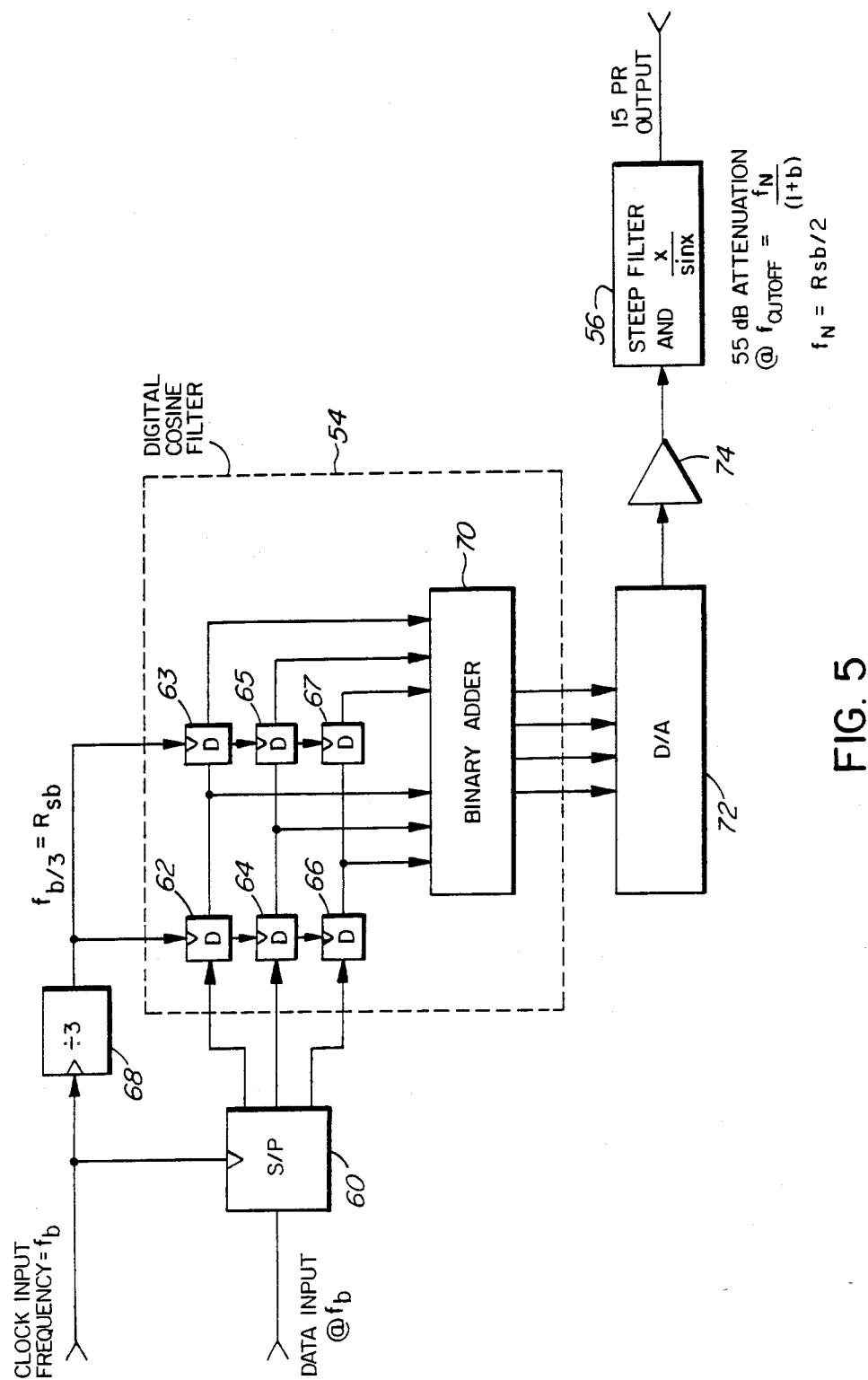
FIG. 5 is a schematic block diagram of a circuit for implementing the system according to a preferred embodiment of the present invention.

With reference to FIG. 5, illustrating a preferred embodiment of the present invention, an incoming binary data stream having a bit rate of $f_b$, is converted into an eight-state symbol signal at a rate of $R_{sb} = f_b/3$ by means of the serial-to-parallel converter (S/P) 60. The eight-state signal is time aligned by a first set of three "D" type flip-flops 62, 64 and 66. The second set of three "D" type flip-flops 63, 65 and 67 provide a unit symbol delay between two successive symbol signals. Timing is provided by dividing the input frequency $f_b$ by three utilizing a divider 68, and clocking flip-flops 62–67 in response thereto. Two successive 8-state symbol signals are output and then added in an adder 70 to provide a 15-state partial response (PR) symbol signal at a symbol rate of $R_{sb} = f_b/3$. The "D" type flip-flops 62–67 and the binary adder 70 form the digital cosine filter 54 discussed above with reference to FIG. 3A.

The 15-state digital symbol signal is then converted into a 15-level analog symbol signal by means of the D/A converter 72. An amplifier 74 serves as a buffer for the filter 56, and provides a voltage offset for the D/A converter 72. The wideband 15-level PR signal is then transmitted through the steep filter 56 having cut-off frequency $f_c = f_N/(1+b)$, where $f_N = R_{sb}/2$. The transmit filter 56 also contains a compensating factor of x/sinx to account for the pulse (instead of impulse) induced sinx/x shaping of the signal spectrum. The signal output from filter 56 is then transmitted via a channel or medium (eg., troposphere), for reception by a remote receiver. Depending on the percentage factor b, the filtered 15-level PR signal can assume a spectral bandwidth $f_c$ which is less than the Nyquist frequency. In other words, the signal can be transmitted at higher than the Nyquist rate.

Figure 1A:
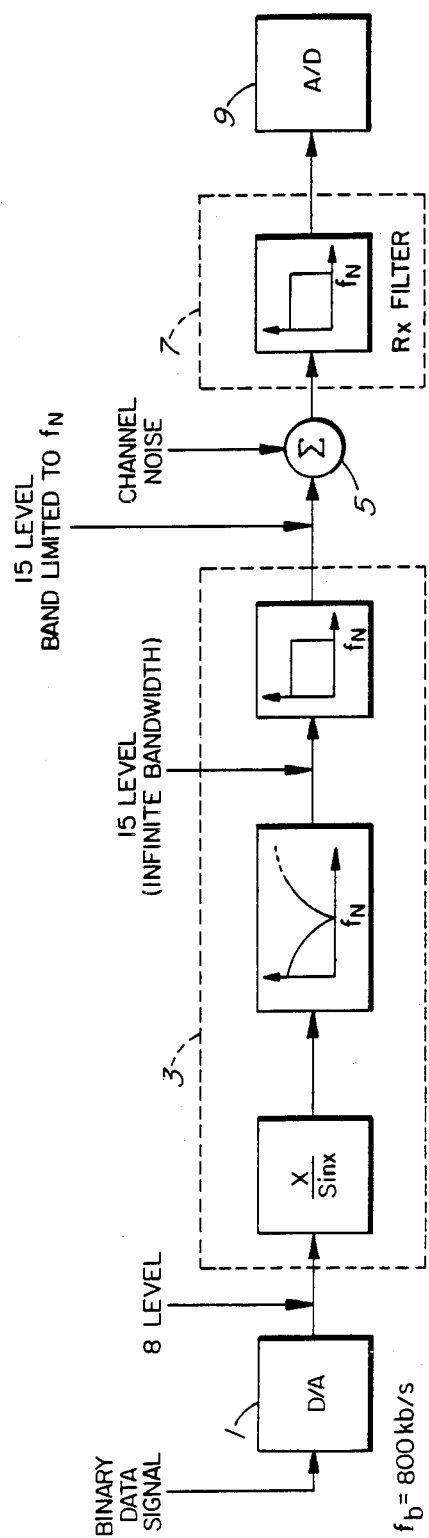
FIG. 1A is a block diagram of a prior art PR transmission system.
Figure 1B:
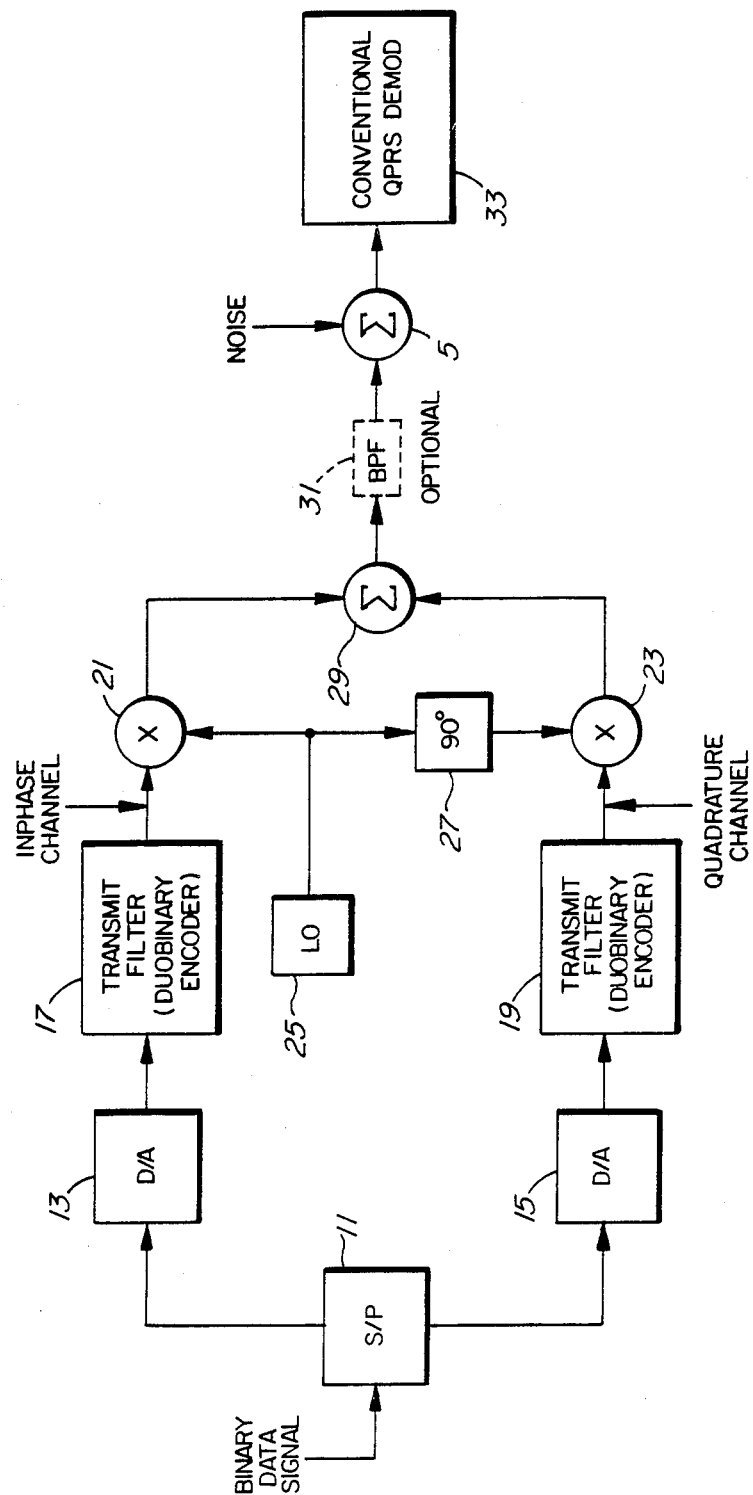
FIG. 1B is a block diagram of a prior art QPR transmission system.
Figure 6:
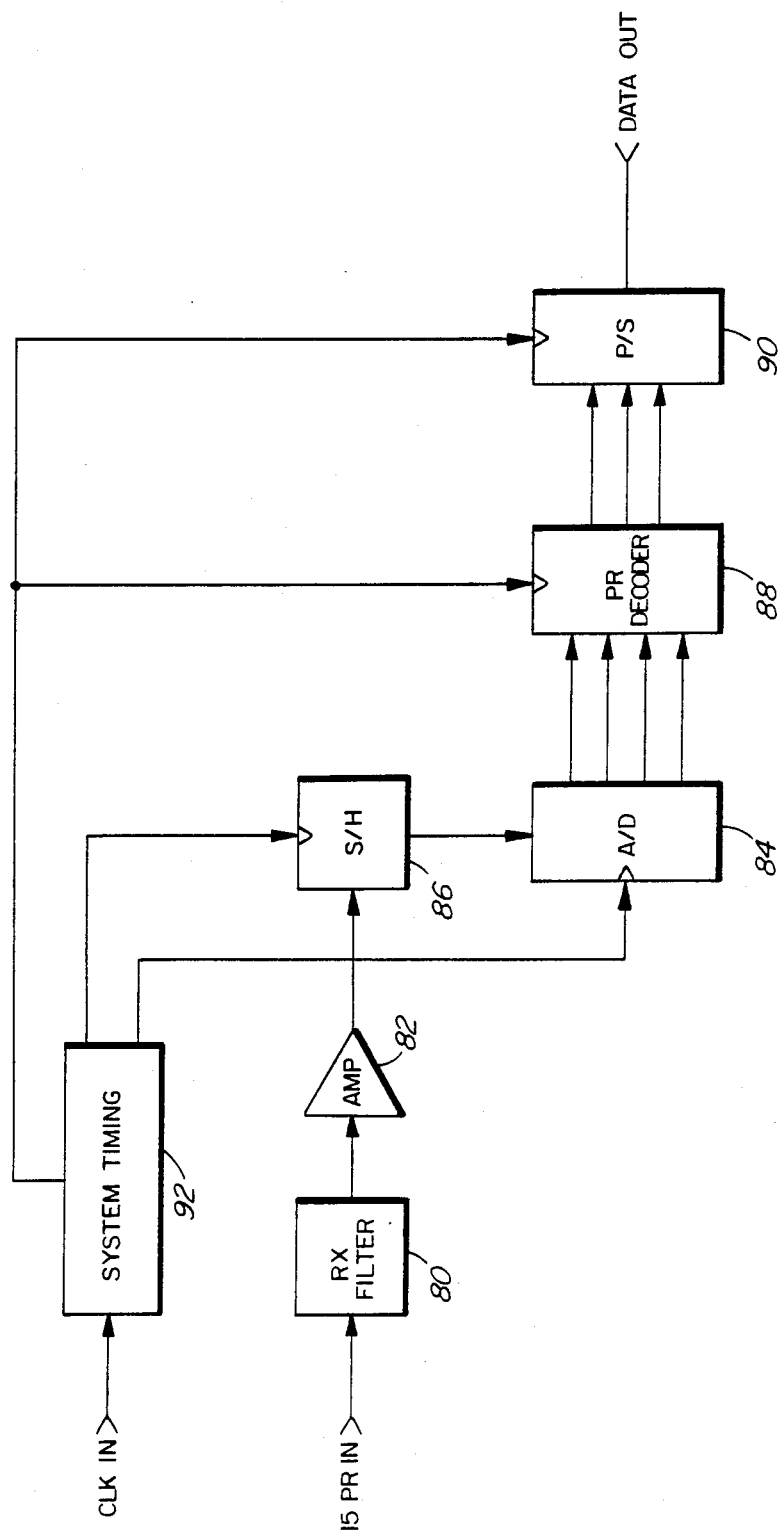
FIG. 6 is a schematic block diagram of a receiver for use with the system according to the present invention.

Referring to FIG. 6, a receiver is shown for receiving the 15-level PR signal transmitted via the circuitry discussed with reference to FIG. 1B. The PR signal is received and filtered via a receive filter 80. This RX filter 80 has flat response in both magnitude and group delay in the range of from DC to $f_N/(1+b)$, so that the 15-level PR signal does not become distorted. The RX filter 80 serves to attenuate unwanted out-of-band noise, and does not have to be a steep filter. The 15-level PR signal is amplified via amplifier 82 so that its 15-levels relate to the decision thresholds of an A/D converter 84 in offset and amplitude. After amplification via amplifier 82, the signal is sampled via sample and hold circuit 86 and held at the sampling instant to allow time for the A/D converter 84 to convert the 15-level PR signal into a 15-state digital word signal. The 15-state digital word is decoded into an 8-state digital word signal via PR decoder 88. This 8-state digital word signal is converted via parallel-to-serial converter P/S 90 into the original input data signal, DATA OUT. Timing for the receiver is generated via a well known timing circuit 92, which receives a clock signal correlated with the received 15-level PR signal.

A person understanding the present invention may conceive of further embodiments or variations thereof. For example, the partial response system according to the present invention can also be used in modulated quadrature partial response (QPR) modems, as well as PAM, QAM and SSB/VSB systems.

Also, the transmission technique of the present invention can be utilized to modify the signalling characteristics of a normal multi-level partial response line signal to provide a two-level line signal for facilitating initialization procedures, such as timing recovery and automatic equalizer control, etc.

These and all other embodiments or variations are considered to be within the sphere and scope of the present invention as defined by the claims appended hereto.

We claim:

1. A data transmission system comprised of:
   (a) means for receiving a digital input signal characterized by a predetermined transmission rate,
   (b) a half-cosine filter for receiving and filtering said received digital input signal and for providing a filtered output signal, characterized by a transfer function having a transmission null at Nyquist frequency, and
   (c) a very steep low-pass filter connected in series with said half-cosine filter, and having a cut-off frequency which is less than the Nyquist frequency by a predetermined amount, for receiving and further filtering said filtered output signal, thereby limiting intersymbol interference and enabling digital signal transmission at a transmission rate greater than the Nyquist rate by said predetermined amount.

2. A data transmission system as defined in claim 1, wherein said cut-off frequency of the low-pass filter is $f_N/1+b$, where $f_N$ is the Nyquist frequency and b is the amount in percentage by which the transmission rat exceeds the Nyquist rate.

3. A data transmission system as defined in claim 1, wherein said half-cosine filter is comprised of:
  (a) a serial-to-parallel converter for receiving said digital input signal in serial format and generating a plurality of parallel signals in response thereto,
  (b) a plurality of flip-flops for time aligning respective ones of said parallel signals, and introducing a predetermined delay between respective ones of said parallel signals, and
  (c) a binary adder for performing a modulo-2 addition of said parallel time divided signals and generating a multi-level partial response output signal in response thereto.

4. A data transmission system as defined in claim 1, wherein said low-pass filter is an approximately rectangular filter characterized by a flat in-band response up to approximately 110 kHz and an approximately 40 dB attenuation at frequencies above approximately 128 kHz.

5. A data transmission system as defined in claim 1, for use in one of either a multi-level partial response or a quadrature partial response signalling system.

6. A data transmission system as defined in claim 1, wherein said half-cosine filter is comprised of an analog low-pass full-wave rectified cosine filter.

7. A data transmission system as defined in claim 1, wherein said half-cosine filter is comprised of a digital low-pass full-wave rectified cosine filter.

8. A data transmission system as defined in claim 1, wherein said means for receiving is comprised of a digital-to-analog converter for receiving said digital input signal and generating a multi-level analog signal in response thereto.

9. A data transmission system as defined in claim 8, wherein said cut-off frequency of the low-pass filter is $f_N/1+b$, where $f_N$ is the Nyquist frequency and b is the amount in percentage by which the transmission rate exceeds the Nyquist rate.

10. A data transmission system as defined in claim 8, wherein said half-cosine filter is comprised of:
  (a) a serial-to-parallel converter for receiving said multi-level analog input signal in serial format and generating a plurality of parallel signals in response thereto,
  (b) a plurality of flip-flops for time aligning respective ones of said parallel signals, and introducing a predetermined delay between respective ones of said parallel signals, and
  (c) a binary adder for performing a modulo-2 addition of said parallel time divided signals and generating a multi-level partial response output signal in response thereto.

11. A data transmission system as defined in claim 8, wherein said low-pass filter is an approximately rectangular filter characterized by a flat in-band response up to approximately 110 kHz and an approximately 40 dB attenuation at frequencies above approximately 128 kHz.

12. A data transmission system as defined in claim 8, for use in one of either a multi-level partial response or a quadrature partial response signalling system.

13. A data transmission system as defined in claim 8 wherein said half-cosine filter is comprised of an analog low-pass full-wave rectified cosine filter.

14. A data transmission system as defined in claim 8, wherein said half-cosine filter is comprised of a digital low-pass full-wave rectified cosine filter.

15. A data transmission system as defined in claim 8, further including an equalizer filter characterized by a x/sinx frequency response, for receiving said multi-level analog signal and generating and applying a frequency equalized analog signal to said half-cosine filter in response thereto.

16. A data transmission system as defined in claim 15, wherein said cut-off frequency of the low-pass filter is $f_N/1+b$, where $f_N$ is the Nyquist frequency and b is the amount in percentage by which the transmission rate exceeds the Nyquist rate.

17. A data transmission system as defined in claim 15, wherein said half-cosine filter is comprised of:
  (a) a serial-to-parallel converter for receiving said frequency equalized analog signal in serial format and generating a plurality of parallel signals in response thereto,
  (b) a plurality of flip-flops for time aligning respective ones of said parallel signals, and introducing a predetermined delay between respective ones of said parallel signals, and
  (c) a binary adder for performing a modulo-2 addition of said parallel time divided signals and generating a multi-level partial response output signal in response thereto.

18. A data transmission system as defined in claim 15, wherein said low-pass filter is an approximately rectangular filter characterized by a flat in-band response up to approximately 110 kHz and an approximately 40 dB attenuation at frequencies above approximately 128 kHz.

19. A data transmission system as defined in claim 15, for use in one of either a multi-level partial response or a quadrature partial response signalling system.

20. A data transmission system as defined in claim 15, wherein said half-cosine filter is comprised of an analog low-pass full-wave rectified cosine filter.

21. A data transmission system as defined in claim 15, wherein said half-cosine filter is comprised of a digital low-pass full-wave rectified cosine filter.

22. A data transmission system comprised of:
  (a) means for receiving a digital input signal characterized by a predetermined transmission rate, and generating an analog input signal in response thereto,
  (b) a first filter for receiving and filtering said analog input signal, and characterized by a first transfer function $H_1(f)$, wherein $H_1(f) = \cos(\pi f/2f_N)$, $f_N$ = Nyquist frequency, and f = the frequency of the input signal,
  (c) a second filter connected in series with said first filter for further filtering said analog input signal, and characterized by a second transfer function $H_2(f)$, wherein $H_2(f) = 1$ for $f = f_N/1+b$, where b = amount in percentage by which said predetermined rate exceeds the Nyquist rate $R_N$, where $R_N = 2f_N$, and wherein $H_2(f) = 0$ otherwise,
whereby said first and second filters generate a band-limited partial response signal transmitted at said predetermined transmission rate in response to receiving and filtering said analog input signal, and (d) means for receiving and demodulating said partial response signal and generating said digital input signal in response thereto.

23. A data transmission system as defined in claim 22, wherein said means for receiving and demodulating is comprised of:
   (a) a receive filter for receiving and partial response signal, characterized by a flat response in both magnitude and group delay for the range of from DC to $f_N/(1+b)$,
   (b) an amplifier for gain adjusting said filtered partial response signal,
   (c) a sample-and-hold circuit for receiving and sampling said gain adjusting filtered partial response signal,
   (d) an analog-to-digital converter for receiving said sampled gain adjusted filtered partial response signal and generating said digital input signal in response thereto.

24. A data transmission system as defined in claim 22, wherein said means for receiving said digital input signal is comprised of a digital to analog converter for receiving said digital input and generating a multi-level analog signal in response thereto.

25. A data transmission system as defined in claim 24, wherein said means for receiving and demodulating is comprised of:
   (a) a receive filter for receiving said partial response signal, characterized by a flat response in both magnitude and group delay for the range of from DC to $f_N/(1+b)$,
   (b) an amplifier for gain adjusting said filtered partial response signal,
   (c) a sample-and-hold circuit for receiving and sampling said gain adjusted filtered partial response signal,
   (d) an analog-to-digital converter for receiving said sampled gain adjusted filtered partial response signal and generating said digital input signal in response thereto.

26. A data transmission system as defined in claim 24, further including an equalizer filter characterized by a $(\pi f/2f)/\sin(\pi f/2f_N)$ frequency response, for receiving said analog input signal and generating and transmitting a phase equalized analog output signal to said first filter in response thereto.

27. A data transmission system as defined in claim 26, wherein said means for receiving and demodulating is comprised of:
   (a) a receive filter for receiving said partial response signal, characterized by a flat response in both magnitude and group delay for the range of from DC to $f_N/(1+b)$,
   (b) an amplifier for gain adjusting said filtered partial response signal,
   (c) a sample-and-hold circuit for receiving and sampling said gain adjusted filtered partial response signal,
   (d) an analog-to-digital converter for receiving said sampled partial gain adjusted filtered response signal and generating said digital input signal in response thereto.

28. A data transmission method comprising the steps of:
   (a) receiving a digital input signal characterized by a predetermined transmission rate, and generating a first multi-level analog signal in response thereto,
   (b) transforming said first multi-level analog signal into a further multi-level analog signal having infinite bandwidth and a greater number of levels than said first multi-level analog signal, and
   (c) band limiting said further multi-level analog signal to a maximum frequency which is less than Nyquist frequency by a predetermined amount, and generating a partial response output signal in response thereto, whereby said predetermined amount is equal to the amount in percentage by which said predetermined transmission rate is greater than the Nyquist rate.

* * * * *